US012585984B2

(12) United States Patent
Liu et al.

(10) Patent No.: US 12,585,984 B2
(45) Date of Patent: Mar. 24, 2026

(54) POINT-OF-INTEREST RECOMMENDATION

(71) Applicant: BEIJING BAIDU NETCOM SCIENCE TECHNOLOGY CO., LTD., Beijing (CN)

(72) Inventors: Hao Liu, Beijing (CN); Weijia Zhang, Beijing (CN); Dejing Dou, Beijing (CN); Hui Xiong, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 1137 days.

(21) Appl. No.: 17/531,132

(22) Filed: Nov. 19, 2021

(65) Prior Publication Data
US 2022/0101199 A1 Mar. 31, 2022

(30) Foreign Application Priority Data
Dec. 24, 2020 (CN) .......................... 202011553174.2

(51) Int. Cl.
*G06N 20/00* (2019.01)

(52) U.S. Cl.
CPC .................................... *G06N 20/00* (2019.01)

(58) Field of Classification Search
CPC ...... G06N 20/00; G06N 3/045; G06N 3/0464; G06N 3/092; G06N 3/084; B60L 2240/72;
(Continued)

(56) References Cited

U.S. PATENT DOCUMENTS

| | | | | |
|---|---|---|---|---|
| 10,254,759 | B1 * | 4/2019 | Faust | B60W 30/00 |
| 11,325,492 | B2 * | 5/2022 | Viswanathan | B60L 58/13 |

(Continued)

FOREIGN PATENT DOCUMENTS

| | | |
|---|---|---|
| CN | 108162771 A | 6/2018 |
| CN | 109146129 A | 1/2019 |

(Continued)

OTHER PUBLICATIONS

Lee, K.-B et al., "Deep Reinforcement Learning Based Optimal Route and Charging Station Selection" Energies 2020 vol. 13, No. 6255 (Nov. 27, 2020) 22 pp. (Year: 2020).*
(Continued)

*Primary Examiner* — Jennifer N Welch
(74) *Attorney, Agent, or Firm* — Leydig, Voit & Mayer, Ltd.

(57) ABSTRACT

A training method for a point-of-interest recommendation model and a method for recommending a point of interest are provided. An implementation solution includes: obtaining training data including a plurality of point-of-interest recommendation requests; determining initialization parameters of the point-of-interest recommendation model; for a first point-of-interest recommendation request among the plurality of point-of-interest recommendation requests, determining a current return for the first point-of-interest recommendation request by utilizing the point-of-interest recommendation model, and determining, based on a second point-of-interest recommendation request initiated after the first point-of-interest recommendation request is completed, a target return for the first point-of-interest recommendation request by utilizing the point-of-interest recommendation model; and adjusting the initialization parameters of the point-of-interest recommendation model based on a difference between the current return and the target return for the first point-of-interest recommendation request, to obtain final parameters of the point-of-interest recommendation model.

20 Claims, 9 Drawing Sheets

(58) Field of Classification Search
CPC .. B60L 53/67; G06Q 30/0266; G06Q 10/047;
G06F 16/9535
See application file for complete search history.

(56) References Cited

U.S. PATENT DOCUMENTS

| | | | |
|---|---|---|---|
| 2023/0024900 A1* | 1/2023 | Ayoola | B60L 55/00 |
| 2023/0043023 A1* | 2/2023 | Klein | G06N 20/00 |

FOREIGN PATENT DOCUMENTS

| | | | |
|---|---|---|---|
| CN | 109741626 A | 5/2019 |
| CN | 109808541 A | 5/2019 |
| CN | 111523722 A | 8/2020 |
| CN | 111538904 A | 8/2020 |
| CN | 111831899 A | 10/2020 |
| CN | 111833205 A | 10/2020 |
| CN | 111897800 A | 11/2020 |
| CN | 111932037 A | 11/2020 |
| CN | 111934335 A | 11/2020 |

OTHER PUBLICATIONS

Tian et al, ("Real-Time Charging Station Recommendation System for Electric-Vehicle Taxis", IEEE 2016, pp. 1-12.*

* cited by examiner

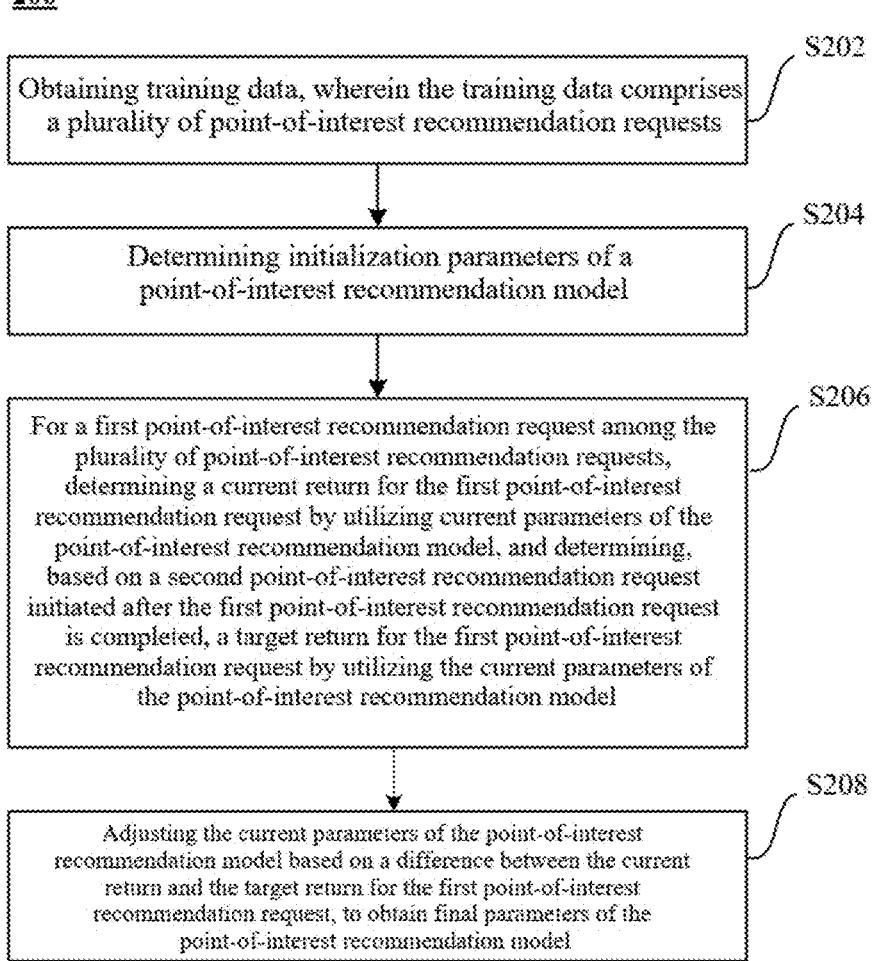

200

S202

Obtaining training data, wherein the training data comprises a plurality of point-of-interest recommendation requests

S204

Determining initialization parameters of a point-of-interest recommendation model

S206

For a first point-of-interest recommendation request among the plurality of point-of-interest recommendation requests, determining a current return for the first point-of-interest recommendation request by utilizing current parameters of the point-of-interest recommendation model, and determining, based on a second point-of-interest recommendation request initiated after the first point-of-interest recommendation request is completed, a target return for the first point-of-interest recommendation request by utilizing the current parameters of the point-of-interest recommendation model

S208

Adjusting the current parameters of the point-of-interest recommendation model based on a difference between the current return and the target return for the first point-of-interest recommendation request, to obtain final parameters of the point-of-interest recommendation model

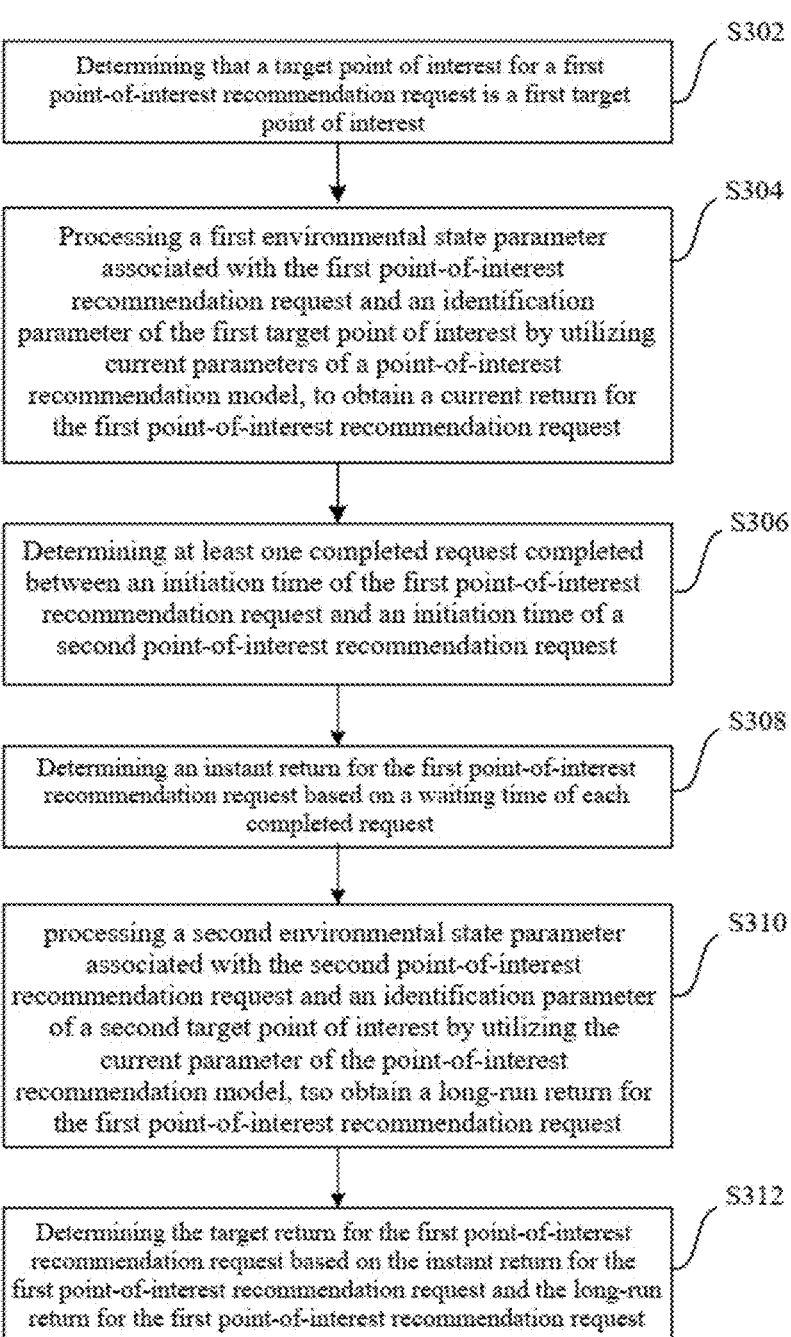

S302

Determining that a target point of interest for a first point-of-interest recommendation request is a first target point of interest

S304

Processing a first environmental state parameter associated with the first point-of-interest recommendation request and an identification parameter of the first target point of interest by utilizing current parameters of a point-of-interest recommendation model, to obtain a current return for the first point-of-interest recommendation request

S306

Determining at least one completed request completed between an initiation time of the first point-of-interest recommendation request and an initiation time of a second point-of-interest recommendation request

S308

Determining an instant return for the first point-of-interest recommendation request based on a waiting time of each completed request

S310 processing a second environmental state parameter associated with the second point-of-interest recommendation request and an identification parameter of a second target point of interest by utilizing the current parameter of the point-of-interest recommendation model, tso obtain a long-run return for the first point-of-interest recommendation request

S312

Determining the target return for the first point-of-interest recommendation request based on the instant return for the first point-of-interest recommendation request and the long-run return for the first point-of-interest recommendation request

*Fig. 3*

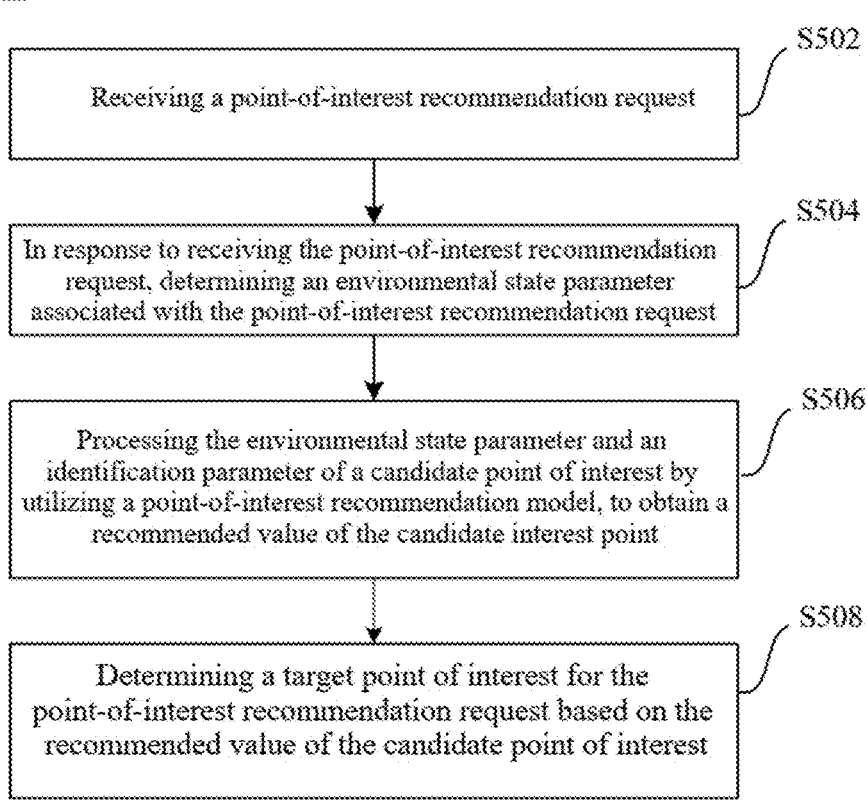

500

S502

Receiving a point-of-interest recommendation request

S504

In response to receiving the point-of-interest recommendation request, determining an environmental state parameter associated with the point-of-interest recommendation request

S506

Processing the environmental state parameter and an identification parameter of a candidate point of interest by utilizing a point-of-interest recommendation model, to obtain a recommended value of the candidate interest point

S508

Determining a target point of interest for the point-of-interest recommendation request based on the recommended value of the candidate point of interest

Training data obtaining unit

610

Parameter obtaining unit

620

Return determining unit

630

Training unit

640

<u>700</u>

Receiving unit

710

Environmental state determining unit

720

Recommended value determining unit

730

Target point-of-interest determining unit

740

POINT-OF-INTEREST RECOMMENDATION

CROSS-REFERENCE TO RELATED APPLICATIONS

This application claims priority to Chinese Patent Application No. 202011553174.2, filed on Dec. 24, 2020, the contents of which are hereby incorporated by reference in their entirety for all purposes.

TECHNICAL FIELD

The present disclosure relates to the technical field of artificial intelligence, in particular to intelligent transportation and deep learning, and specifically to a training method for a point-of-interest recommendation model, a method for recommending a point of interest an electronic device, and a non-transitory computer-readable storage medium.

BACKGROUND

Artificial intelligence is a subject on making a computer to simulate some thinking processes and intelligent behaviors (such as learning, reasoning, thinking, planning, etc.) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, and machine learning/deep learning, big data processing technologies, and knowledge graph technologies.

In a geographic information system, there is a wide variety of points of interest. A user can go to various points of interest to obtain corresponding services. Information about the points of interest can be used for path planning.

The methods described in this section are not necessarily methods that have been previously conceived or employed. It should not be assumed that any of the methods described in this section are considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a training method for a point-of-interest recommendation model, a method for recommending a point of interest, and a corresponding apparatus, an electronic device, a computer-readable storage medium, and a computer program product.

According to an aspect of the present disclosure, there is provided a training method for a point-of-interest recommendation model, including: obtaining training data, wherein the training data includes a plurality of point-of-interest recommendation requests; determining initialization parameters of the point-of-interest recommendation model; for a first point-of-interest recommendation request among the plurality of point-of-interest recommendation requests, determining a current return for the first point-of-interest recommendation request by utilizing the point-of-interest recommendation model, and determining, based on a second point-of-interest recommendation request initiated after the first point-of-interest recommendation request is completed, a target return for the first point-of-interest recommendation request by utilizing the point-of-interest recommendation model; and adjusting the initialization parameters of the point-of-interest recommendation model based on a difference between the current return and the target return for the first point-of-interest recommendation request, to obtain final parameters of the point-of-interest recommendation model.

According to another aspect of the present disclosure, there is provided a method for recommending a point of interest, the method being applied to a computing device running a point-of-interest recommendation model thereon, and the point-of-interest recommendation model being trained by using the above mentioned method, wherein the method includes: receiving a point-of-interest recommendation request; in response to receiving the point-of-interest recommendation request, determining an environmental state parameter associated with the point-of-interest recommendation request, wherein the environmental state parameter includes resource occupation information and predictive use information of a candidate point of interest when the point-of-interest recommendation request is initiated; processing the environmental state parameter and an identification parameter of the candidate point of interest by utilizing the point-of-interest recommendation model, to obtain a recommended value of the candidate point of interest; and determining a target point of interest for the point-of-interest recommendation request based on the recommended value of the candidate point of interest.

According to another aspect of the present disclosure, there is provided a training apparatus for a point-of-interest recommendation model, including: a training data obtaining unit configured to obtain training data, wherein the training data includes a plurality of point-of-interest recommendation requests; a parameter obtaining unit configured to determine initialization parameters of the point-of-interest recommendation model; a return determining unit configured to, for a first point-of-interest recommendation request among the plurality of point-of-interest recommendation requests, determine a current return for the first point-of-interest recommendation request by utilizing the point-of-interest recommendation model, and determine, based on a second point-of-interest recommendation request initiated after the first point-of-interest recommendation request is completed, a target return for the first point-of-interest recommendation request by utilizing the point-of-interest recommendation model; and a training unit configured to adjust the initialization parameters of the point-of-interest recommendation model based on a difference between the current return and the target return for the first point-of-interest recommendation request, to obtain final parameters of the point-of-interest recommendation model.

According to another aspect of the present disclosure, there is provided an apparatus for recommending a point of interest, the apparatus running a point-of-interest recommendation model being trained by using the above-mentioned method, wherein the apparatus includes: a receiving unit configured to receive a point-of-interest recommendation request; an environmental state determining unit configured to, in response to receiving the point-of-interest recommendation request, determine an environmental state parameter associated with the point-of-interest recommendation request, wherein the environmental state parameter includes resource occupation information and predictive use information of a candidate point of interest when the point-of-interest recommendation request is initiated; a recommended value determining unit configured to process the environmental state parameter and an identification parameter of the candidate point of interest by utilizing the point-of-interest recommendation model, to obtain a recommended value of the candidate point of interest; and a target point-of-interest determining unit configured to determine a target point of interest for the point-of-interest recommendation request based on the recommended value of the candidate point of interest.

According to another aspect of the present disclosure, there is provided a navigation apparatus, including: a receiving unit configured to receive a point-of-interest recommendation request; an environmental state determining unit configured to, in response to receiving the point-of-interest recommendation request, determine an environmental state parameter associated with the point-of-interest recommendation request, wherein the environmental state parameter includes resource occupation information and predictive use information of a candidate point of interest when the point-of-interest recommendation request is initiated; a recommended value determining unit configured to process the environmental state parameter and an identification parameter of the candidate point of interest by utilizing a point-of-interest recommendation model trained by using the above mentioned method, to obtain a recommended value of the candidate point of interest; a target point-of-interest determining unit configured to determine a target point of interest for the point-of-interest recommendation request based on the recommended value of the candidate point of interest; and a route determining unit configured to generate a path to the target point of interest.

According to another aspect of the present disclosure, there is provided an electronic device, including: at least one processor; and a memory communicatively connected to the at least one processor, wherein the memory stores instructions executable by the at least one processor, and when executed by the at least one processor, the instructions cause the at least one processor to perform the above-mentioned method.

According to another aspect of the present disclosure, there is provided a non-transitory computer-readable storage medium storing computer instructions, wherein the computer instructions are used to cause a computer to perform the above-mentioned method.

According to another aspect of the present disclosure, there is provided a computer program product, including a computer program, wherein when the computer program is executed by a processor, the above-mentioned method is implemented.

According to one or more embodiments of the present disclosure, it is possible to make the point-of-interest recommendation model more easily learn a globally optimal recommendation result. By using such a point-of-interest recommendation model, it is possible to generate, for the point-of-interest recommendation request, a point-of-interest recommendation result that enables a global optimum.

It should be understood that the content described in this section is not intended to identify critical or significant features of the embodiments of the present disclosure, nor is it intended to limit the scope of the present disclosure. Other features of the present disclosure will be easily comprehensible from the following description.

BRIEF DESCRIPTION OF THE DRAWINGS

The drawings show embodiments and form a part of the specification in some embodiments, and are used to explain example implementations of the embodiments together with a written description of the specification. The embodiments shown are merely for illustrative purposes and do not limit the scope of the claims. Throughout the drawings, like reference signs denote like but not necessarily identical elements.

FIG. 2 is a schematic flowchart of a training method for a point-of-interest recommendation model according to an embodiment of the present disclosure;

FIG. 3 is a schematic flowchart of determining an instant return and a target return for a first point-of-interest recommendation request according to an embodiment of the present disclosure by using a point-of-interest recommendation model;

FIG. 5 is a schematic flowchart of a method for recommending a point of interest according to an embodiment of the present disclosure;

DETAILED DESCRIPTION OF THE EMBODIMENTS

Figure 1:
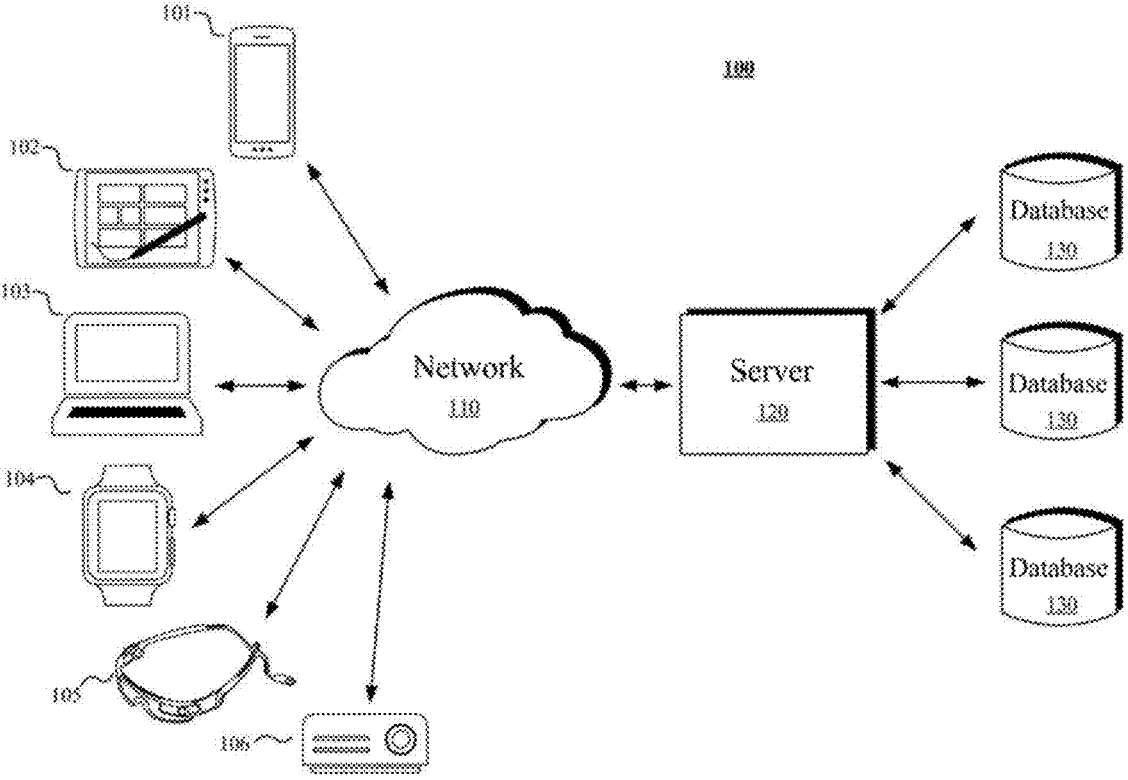
FIG. 1 is a schematic diagram of an example system in which various methods described herein can be implemented according to an embodiment of the present disclosure.

The following describes example embodiments of the present disclosure in conjunction with the accompanying drawings, including various details of the embodiments of the present disclosure to facilitate understanding, and they should be considered as merely example. Therefore, those of ordinary skill in the art should be aware that various changes and modifications can be made to the embodiments described herein, without departing from the scope of the present disclosure. Likewise, for clarity and brevity, descriptions of well-known functions and structures are omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual descriptions, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, the term "and/or" used in the present disclosure encompasses any of and all possible combinations of listed items.

In some scenarios, a user may expect to obtain recommendation information of a predetermined type of point of interest. The point of interest may be a predefined geographic object. For example, the point of interest may be a school, bank, restaurant, gas station, parking lot, charging station, or the like. A charging station (such as an electric vehicle charging station) will be taken as an example of the point of interest below to describe the principle of the present disclosure. However, those skilled in the art can understand that without departing from the principle of the present disclosure, those skilled in the art can make modifications, based on actual situations, to the solutions provided in the present disclosure to obtain solutions specific to different types of other points of interest.

In the related art, a point of interest that is the nearest in distance or requires the shortest traveling time may be recommended to the user as the best point-of-interest recommendation result. However, such a recommendation result is based on recommendation using a greedy method, which may cause resource allocation for a plurality of points of interest as a whole to be only a local optimum with a low long-run return.

In order to make the plurality of points of interest as a whole have a relatively high long-run return, the present disclosure provides a new training method for a point-of-interest recommendation model and a new method for recommending a point of interest.

Embodiments of the present disclosure are described in detail below in conjunction with the drawings.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communication networks 110 that couple the one or more client devices to the server 120. The client devices 101, 102, 103, 104, 105, and 106 may be configured to execute one or more application programs.

In an embodiment of the present disclosure, the server 120 may run one or more services or software applications that enable a training method for a point-of-interest recommendation model and/or a method for recommending a point of interest according to the present disclosure to be performed. In some embodiments, alternatively, the client devices 101, 102, 103, 104, 105, and 106 may be used to run one or more services or software applications of a training method for a point-of-interest recommendation model and/or a method for recommending a point of interest according to the present disclosure.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from the system 100. Therefore, FIG. 1 is an example of the system for implementing various methods described herein, and is not intended to be limiting.

The user can use the client device 101, 102, 103, 104, 105, and/or 106 to input a point-of-interest recommendation request and obtain a point-of-interest recommendation result. The client device may provide an interface that enables the user of the client device to interact with the client device. The client device may also output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices can run various types and versions of software application programs and operating systems, such as Microsoft Windows, Apple iOS, a UNIX-like operating system, and a Linux or Linux-like operating system (e.g., Google Chrome OS); or include various mobile operating systems, such as Microsoft Windows Mobile OS, iOS, Windows Phone, and Android. The portable handheld device may include a cellular phone, a smart phone, a tablet computer, a personal digital assistant (PDA), etc. The wearable device may include a head-mounted display and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 can also run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may alternatively be a cloud server, or an intelligent cloud computing server or intelligent cloud host with artificial intelligence technologies. The cloud server is a host product in a cloud computing service system, to overcome the shortcomings of difficult management and weak service scalability in conventional physical host and virtual private server (VPS) services.

The system 100 may further include one or more repository 130. In some embodiments, the repository can be used to store data and other information. For example, one or more of the repository 130 can be used to store information such as an audio file and a video file. The data repository 130 may reside in various locations. For example, a data repository used by the server 120 may be locally in the server 120, or may be remote from the server 120 and may communicate with the server 120 via a network-based or dedicated connection. The data repository 130 may be of different types. In some embodiments, the data repository used by the server 120 may be a database, such as a relational database. One or more of these databases can store, update, and retrieve data from or to the database, in response to a command.

In some embodiments, one or more of the repositories 130 may also be used by an application program to store application program data. The repository used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

FIG. 2 is a schematic flowchart of a training method 200 for a point-of-interest recommendation model according to an embodiment of the present disclosure. The method shown in FIG. 2 may be implemented by the client devices 101 to 106 or the server 120 shown in FIG. 1.

In the training method for a point-of-interest recommendation model shown in FIG. 2, a set of points of interest (also referred to as a point-of-interest network) formed by a plurality of points of interest may be considered as an intelligent agent for training. For example, when the point of interest is an electric vehicle charging station, a charging network formed by all electric vehicle charging stations within a predetermined area (e.g., a specified city) may be considered as an intelligent agent for training. For another example, when the point of interest is a parking lot, a parking lot network formed by all parking lots within a predetermined area may be considered as an intelligent agent for training.

In step S202, training data may be obtained, wherein the training data may include a plurality of point-of-interest recommendation requests.

The training data may be a record of an actual point-of-interest recommendation process. For example, the training data may be obtained by recording a point-of-interest recommendation request initiated historically in a predetermined area and a corresponding point-of-interest recommendation result. For another example, a simulator set with a series of rules can also be set to simulate a point-of-interest recommendation request initiated in a real scenario and a corresponding point-of-interest recommendation result, and a simulation result output by the simulator may be used as the training data.

In some embodiments, the point-of-interest recommendation request may be generated in response to input information from a user. For example, a text input apparatus (such as a keyboard, touchscreen, or handwriting pad) provided on a client device may be used to receive a text input from the user, or a voice input apparatus (such as a microphone) provided on the client device may be used to receive a voice input from the user, so as to identify a point of interest expected by the user, and generate a corresponding point-of-interest recommendation request.

In some other embodiments, the point-of-interest recommendation request may be generated in response to a predefined event. For example, when it is detected that battery power of an electric vehicle is lower than a predefined power threshold, the point-of-interest recommendation request may be generated to recommend a suitable charging station to the user. For another example, when it is detected that the user has approached a preset destination, the point-of-interest recommendation request may be generated to recommend a suitable parking lot to the user.

The training data may include a plurality of point-of-interest recommendation requests generated for a point-of-interest network within a certain period of time, an initiation time of each point-of-interest recommendation request, an initiation location of each point-of-interest recommendation request, and a target point of interest for each point-of-interest recommendation request. For example, when the point of interest is an electric vehicle charging station, the training data may include a plurality of charging requests generated for a charging station network within a predetermined period of time (any period of time such as 8 hours or 24 hours), an initiation time and an initiation location of each charging request, and a recommended charging station for each charging request.

In step S204, initialization parameters of the point-of-interest recommendation model may be determined.

In some embodiments, a deep neural network may be used to implement the foregoing point-of-interest recommendation model. A deep neural network formed by a combination of common deep neural network elements such as a convolutional layer, a pooling layer, and a fully connected layer may be used to implement the foregoing point-of-interest recommendation model. In some examples, a multilayer perceptron (MLP) model may be used to implement the foregoing point-of-interest recommendation model. A specific structure of the point-of-interest recommendation model is not limited herein.

In some embodiments, the initialization parameters of the point-of-interest recommendation model may be randomly generated. In some other embodiments, the initialization parameters of the point-of-interest recommendation model may alternatively be obtained by training the model using pre-trained data.

In step S206, for a first point-of-interest recommendation request among the plurality of point-of-interest recommendation requests, the point-of-interest recommendation model may be used to determine a current return for the first point-of-interest recommendation request, and the point-of-interest recommendation model may also be used to determine, based on a second point-of-interest recommendation request initiated after the first point-of-interest recommendation request is completed, a target return for the first point-of-interest recommendation request.

The first point-of-interest recommendation request may be determined by means of random sampling from the plurality of point-of-interest recommendation requests included in the training data. It can be understood that, without departing from the principle of the present disclosure, those skilled in the art may alternatively use other suitable methods to determine the first point-of-interest recommendation request from the plurality of point-of-interest recommendation requests included in the training data. For example, the plurality of point-of-interest recommendation requests included in the training data may be sorted based on a predetermined time sequence, and the point-of-interest recommendation requests may be sequentially determined according to the time sequence as a first point-of-interest recommendation request to be processed currently.

By using the point-of-interest recommendation model to process the first point-of-interest recommendation request, the current return for a result of point-of-interest recommendation by the point-of-interest recommendation model for the first point-of-interest recommendation request can be obtained.

In some embodiments, in the case of processing the first point-of-interest recommendation request, a current parameter of the point-of-interest recommendation model may be used to process the first point-of-interest recommendation request. In other words, a parameter obtained after the training of the previous training round of the current training round may be used to process the first point-of-interest recommendation request.

By using the point-of-interest recommendation model to process the second point-of-interest recommendation request initiated after the first point-of-interest recommendation request is completed, a long-run target return after the first point-of-interest recommendation request is completed can be obtained.

In some embodiments, in the case of using the point-of-interest recommendation model to process the second point-of-interest recommendation request initiated after the first point-of-interest recommendation request is completed, a target parameter of the point-of-interest recommendation model may be used to process the second point-of-interest recommendation request. The target parameter of the point-of-interest recommendation model and the current parameter of the point-of-interest recommendation model may be the same or different. For example, the target parameter may be a parameter of the point-of-interest recommendation model obtained in the previous training round. In some implementations, the target parameter of the point-of-interest recommendation model may be updated at regular intervals to the current parameter of the point-of-interest recommendation model obtained after training.

In step S208, the initialization parameters of the point-of-interest recommendation model may be adjusted based on a difference between the current return and the target return for the first point-of-interest recommendation request, to obtain final parameters of the point-of-interest recommendation model.

In some embodiments, a loss function for training the point-of-interest recommendation model can be determined based on a difference between the current return and the target current for the first point-of-interest recommendation request, and based on the amount of value of the loss function, a backpropagation algorithm may be used to adjust the current parameter of the point-of-interest recommendation model. By continuously repeating the training steps shown in FIG. 2, the parameter of the point-of-interest recommendation model can be continuously updated until the result of the loss function converges within a predetermined range or the number of training times exceeds a predetermined maximum number of times.

In some implementations, the value of the loss function of the point-of-interest recommendation model can be determined based on the square of the difference between the current return and the target return. For example, the loss function of the point-of-interest recommendation model can be calculated based on the following formula (1):

$$L(\theta) = \mathbb{E}\left[(Q(q_t) - y_t)^2\right] \tag{1}$$

where $L(\theta)$ represents the loss of the point-of-interest recommendation model, $Q(q_t)$ represents the current return for the first point-of-interest recommendation request $q_t$, $y_t$ represents the target return for the first point-of-interest recommendation request $q_t$, and $\mathbb{E}$ represents that the loss function $L(\theta)$ is the mean of a result calculated by using different point-of-interest recommendation requests in the training data as the first point-of-interest recommendation request.

By using the training method for a point-of-interest recommendation model provided in the present disclosure, for any first point-of-interest recommendation request among the plurality of point-of-interest recommendation requests, a second point-of-interest recommendation request initiated after the first point-of-interest recommendation request is completed may be used to determine the target return for the first point-of-interest recommendation request. The target return determined in this way may include a long-run return brought to the entire point-of-interest network after a recommendation is made for the first point-of-interest recommendation request, such that the point-of-interest recommendation model can more easily learn a globally optimal recommendation result.

FIG. 3 is a schematic flowchart of using a point-of-interest recommendation model to determine an instant return and a target return for a first point-of-interest recommendation request according to an embodiment of the present disclosure. The method 300 shown in FIG. 3 may be used to implement step S206 shown in FIG. 2.

The steps S302 and S304 shown in FIG. 3 may be used to determine the current return for the first point-of-interest recommendation request.

In step S302, it may be determined that a target point of interest for the first point-of-interest recommendation request is a first target point of interest.

In some embodiments, the training data may include a plurality of point-of-interest recommendation requests and target points of interest for the point-of-interest recommendation requests. For example, it may be determined based on the training data that a target point of interest for the first point-of-interest recommendation request in a real (simulated) environment recorded in the training data is the first target point of interest.

In some embodiments, the training data may further include environmental state parameter(s) associated with the point-of-interest recommendation requests. The environmental state parameter includes resource occupation information and predictive use information of a candidate point(s) of interest when the point-of-interest recommendation requests are initiated. By using the environmental state parameter including the resource occupation information and the predictive use information of the candidate point of interest, the overall nature of the entire point-of-interest network can be considered during the calculation of a return for a point-of-interest recommendation result, thereby optimizing the recommendation effect.

The environmental state parameter may be used to indicate a state of each point of interest in the point-of-interest network when each point-of-interest recommendation request is initiated.

The candidate point(s) of interest may include all or some points of interest included in the point-of-interest network. For example, the candidate point of interest may be part of the points of interest currently available in the point-of-interest network. For another example, for any point-of-interest recommendation request, the candidate point of interest may be a point of interest within a predetermined distance from an initiation location of the point-of-interest recommendation request.

The resource occupation information may refer to an occupation status of service resources at the point of interest. For example, when the point of interest is an electric vehicle charging station, the resource occupation information of the point of interest may be an amount of idle charging spaces or occupied charging spaces of the charging station. By using the method provided in the present disclosure, different points of interest can be recommended to users in different scenarios to meet the requirements of the users.

For example, when the point of interest is a parking lot, the resource occupation information of the point of interest may be an amount of idle parking spaces or occupied parking spaces of the parking lot. Similarly, for different types of points of interest, those skilled in the art may select corresponding parameters to indicate the occupation status of service resources at the points of interest.

The predictive use information can indicate the use status of the point-of-interest network within a period of time in the future. In some embodiments, predictive use information of an environmental state parameter associated with a point-of-interest recommendation request includes a predicted amount of other point-of-interest recommendation requests initiated within a predetermined distance around each candidate point of interest within a predetermined time range after the point-of-interest recommendation request is received. By using the value of the predicted amount of recommendation requests initiated near the candidate point of interest within a subsequent period of time, the load of the entire point-of-interest network within the period of time after the current point-of-interest recommendation request is initiated can be considered during the training of the model, such that the recommendation result can be optimized.

For example, when the point of interest is an electric vehicle charging station, the predictive use information may be an amount of charging requests within a specific distance near each charging station in the charging station network within 15 minutes (or any other predetermined period of time) after the point-of-interest recommendation request is received. For example, when the point of interest is a parking lot, the predictive use information may be a predicted amount of parking requests within a specific distance near each parking lot in the parking lot network within 15 minutes after the point-of-interest recommendation request is received.

In some implementations, a pre-trained prediction model may be used to obtain the foregoing predictive use information. For example, an MLP model may be used to implement the foregoing prediction model. By using the trained prediction model to process an amount of historical point-of-interest recommendation requests near each point of interest, a predicted amount of point-of-interest recommendation requests initiated near each point of interest within a predetermined period of time in the future can be obtained.

In some embodiments, the environmental state parameters associated with the point-of-interest recommendation requests further include: time when the point-of-interest recommendation requests are received, traveling time from geographical locations associated with the point-of-interest recommendation requests (for example, locations where the point-of-interest recommendation requests are initiated) to the candidate point(s) of interest, and service capability information of the candidate point(s) of interest. By considering various factors that have impact on a point-of-interest network in the environmental state parameters, the point-of-interest recommendation result can be further optimized.

The traveling time from the geographical locations associated with the point-of-interest recommendation requests (for example, the locations where the point-of-interest recommendation requests are initiated) to the candidate point(s) of interest may be determined based on the geographical locations where the point-of-interest recommendation requests are initiated and traffic information when the point-of-interest recommendation requests are initiated.

The service capability information of the candidate point(s) of interest may indicate capabilities of the points of interest to provide corresponding services. Generally, a user expects a corresponding service at a point of interest, and therefore a service capability of a candidate point of interest may indicate a time for which the user may stay at the point of interest. For example, when the point of interest is an electric vehicle charging station, the service capability information may be charging power of charging stations in a charging station network. For example, when the point of interest is a parking lot, the service capability information may be an average time for which vehicles stay in the parking lot, or the like. Based on service capability information determined for different scenarios, corresponding points of interest can be recommended for different application scenarios.

In step S304, a first environmental state parameter associated with the first point-of-interest recommendation request and an identification parameter of the first target point of interest can be processed by utilizing the point-of-interest recommendation model, to obtain the current return for the first point-of-interest recommendation request.

In some embodiments, both the first environmental state parameter associated with the first point-of-interest recommendation request and the identification parameter of the first target point of interest may be used as an input of the point-of-interest recommendation model, and an output of the point-of-interest recommendation model is considered as the current return for the first point-of-interest recommendation request.

As described above, when the point of interest is a charging station, the first environmental state parameter may include: a time when the first point-of-interest recommendation request is received, an amount of currently idle charging spaces of each candidate charging station, a predicted amount of charging requests in the vicinity of each candidate charging station within a period of time (e.g., 15 minutes) in the future, a traveling time from a location where the first point-of-interest recommendation request is initiated to each candidate charging station, and charging power of each candidate charging station. In some implementations, the first environmental state parameter may be a vector formed by the foregoing five parameters as a combination.

The identification parameter of the first target point of interest may be a vector for indicating that the first target point of interest is used for the first point-of-interest recommendation request. In some implementations, a one-hot code may be used to represent the identification parameter of the first target point of interest. For example, when the amount of candidate points of interest is N (N is an integer greater than 1), an action vector including N parameters may be used to represent identification parameters of respective candidate points of interest as the target point of interest. The parameters in the action vector each correspond to one candidate point of interest. For example, when the first parameter in the action vector corresponds to the first target point of interest, the vector [1 0 0 . . . 0] may be used as the identification parameter of the first target point of interest. Similarly, one-hot encoding may be used to determine identification parameters of other candidate points of interest.

In some implementations, a vector representing the first environmental state parameter and a vector representing the identification parameter of the first target point of interest may be combined by concat as an input vector of the point-of-interest recommendation model. The point-of-interest recommendation model may output a recommended value for recommending the first target point of interest for the first point-of-interest recommendation request as the current return for the first point-of-interest recommendation request.

Steps S306 to S312 show a schematic process of determining the target return for the first point-of-interest recommendation request. During the calculation of the target return, by considering an instant return generated from a recommendation action for the first point-of-interest recommendation request and a long-run return for the entire point-of-interest network determined based on a return for a second point-of-interest recommendation request initiated later, the target return calculated in this way can reflect long-run impact of the recommendation result on the entire point-of-interest network.

In step S306, at least one completed request completed between an initiation time of the first point-of-interest recommendation request and an initiation time of the second point-of-interest recommendation request may be determined.

In some embodiments, the second point-of-interest recommendation request is a point-of-interest recommendation request initiated after the first point-of-interest recommendation request is completed. In some implementations, when a user reaches the target point of interest recommended and starts to obtain the service supply from the point of interest, it can be considered that the point-of-interest recommendation request is completed.

For example, the point of interest is a charging station. After a user reaches a recommended charging station, if there is an idle charging space in the charging station, the user can start charging an electric vehicle without waiting. At this point, it can be considered that a charging station recommendation request has been completed. If the charging station does not have an idle charging space when the user reaches the recommended charging station, the user will have to wait for a period of time until there is an idle charging space for the charging service. Therefore, it is considered that the charging station recommendation request has not been completed until the user finds an idle charging space for charging.

In some examples, the second point-of-interest recommendation request is the point-of-interest recommendation request firstly initiated after the first point-of-interest recommendation request is completed. The second point-of-interest recommendation request determined in this way can help more effectively determine long-run impact of the recommendation result of the first point-of-interest recommendation request on the entire point-of-interest network.

For example, for a first point-of-interest recommendation request $q_t$, an initiation time of the first point-of-interest recommendation request $q_t$ may be determined as $T_t$, and a completion time of the first point-of-interest recommendation request $q_t$ is $T_t^c$. The second point-of-interest recommendation request $q_s$ may be the point-of-interest recommendation request firstly initiated after the time point $T_t^c$ in the point-of-interest network. It can be understood that the second point-of-interest recommendation request may not be the point-of-interest recommendation request firstly initiated after the first point-of-interest recommendation request $q_t$ is initiated in the charging station network, and other point-of-interest recommendation requests may be initiated between the initiation time $T_t$ of the first point-of-interest recommendation request $q_t$ and the completion time $T_t^c$ of the first point-of-interest recommendation request $q_t$.

In addition, at least one of the other point-of-interest recommendation requests is completed between the initiation time $T_t$ of the first point-of-interest recommendation request $q_t$ and the completion time $T_t^c$ of the first point-of-interest recommendation request.

In step S308, the instant return for the first point-of-interest recommendation request may be determined based on a waiting time of each completed request between the initiation time $T_t$ of the first point-of-interest recommendation request $q_t$ and the completion time $T_t^c$ of the first point-of-interest recommendation request $q_t$.

The waiting time of each point-of-interest recommendation request may be a time period between the time when the point-of-interest recommendation request is initiated and the time when the user obtains a service at the recommended point of interest.

In some embodiments, a completion return for each completed request may be determined based on the waiting time of each completed request, wherein the waiting time is inverse to the completion return. The instant return for the first point-of-interest recommendation request may be determined based on a weighted sum of completion returns for completed requests.

By calculating returns for other requests completed between the initiation of the first point-of-interest recommendation request and the initiation of the second point-of-interest recommendation request, impact of the point-of-interest recommendation result on the entire point-of-interest network can be considered, thereby optimizing the recommendation result.

In some implementations, a negative value of the waiting time of each completed request may be determined as the completion return for each completed request. For example, if a waiting time for a first completed request is 3 minutes, a completion return for the first completion request may be determined as −3. In some examples, when a waiting time of a completed request exceeds a waiting time threshold, a completion return for the completed request may be determined as a predefined minimum completion return. For example, if a waiting time of a second completed request exceeds 45 minutes, a completion return for the second completed request may be determined as the predefined minimum completion return of −60. It can be understood that the values of the foregoing completion return and minimum completion return are only an example description, and those skilled in the art may determine specific calculation manners of the completion return and minimum completion return based on actual situations. For example, a reciprocal of the waiting time may be determined as the completion return.

In some embodiments, the instant return for the first point-of-interest recommendation request may be an instant return during the time period from the initiation of the first point-of-interest recommendation request to the initiation of the second point-of-interest recommendation request.

The instant return for the first point-of-interest recommendation request may be determined based on the following formula (2):

$$R_{t:s} = \sum_{T_t < T_{t'}^c \le T_s} \gamma^{(T_{t'}^c - T_t - 1)} r(s_{t'}, a_{t'}) \tag{2}$$

where $T_t$ represents the initiation time of the first point-of-interest recommendation request $q_t$, $T_s$ represents the initiation time of the second point-of-interest recommendation request $q_s$, $R_{t:s}$ represents the instant return for the first point-of-interest recommendation request $q_t$ within the time period between $T_t$ and $T_s$, $T_{t'}^c$ represents a completion time of the completed request $q_{t'}$ within the time period between $T_t$ and $T_s$, $r(s_{t'}, a_{t'})$ represents a completion return for the completed request $q_{t'}$, wherein $s_{t'}$ is an environmental state parameter associated with the completed request $q_{t'}$, $a_{t'}$ represents an identification parameter of a target point of interest recommended for the completed request $q_{t'}$, and $\gamma$ is a discount factor. For example, $\gamma$ may be any value between 0 and 1. In some examples, the value of $\gamma$ may be 0.99. During calculation of the power $(T_{t'}^c - T_t - 1)$ of the discount factor $\gamma$ in formula (2), $T_{t'}^c$ and $T_t$ may be measured in minutes.

By using formula (2), completion returns for all completed requests within the time period between $T_t$ and $T_s$ can be calculated, and weighting factors of the completed requests can be determined based on the discount factor.

In step S310, a second environmental state parameter associated with the second point-of-interest recommendation request and an identification parameter of a second target point of interest can be processed by the point-of-interest recommendation model, to obtain a long-run return for the first point-of-interest recommendation request. The second target point of interest may be one of the candidate points of interest. The point-of-interest recommendation model may be used to separately process the second environmental state parameter and an identification parameter of each candidate point of interest, to determine the second target point of interest.

In some embodiments, a target parameter of the point-of-interest recommendation model may be used to process the second environmental state parameter associated with the second point-of-interest recommendation request and the identification parameter of each candidate point of interest, to obtain a recommended value of each candidate point of interest as the target point of interest for the second point-of-interest recommendation request. A target point of interest with a largest recommended value may be determined as the second target point of interest for the second point-of-interest recommendation request, and the foregoing largest recommended value for the second target point of interest may be determined as the long-run return for the first point-of-interest recommendation request.

In step S312, the target return for the first point-of-interest recommendation request may be determined based on the instant return for the first point-of-interest recommendation request and the long-run return for the first point-of-interest recommendation request.

In some embodiments, a weighted sum of the instant return for the first point-of-interest recommendation request and the long-run return for the first point-of-interest recommendation request may be determined as the target return for the first point-of-interest recommendation request. By considering both the instant return and the long-run return at the same time, the recommendation result can be further optimized.

For example, the target return for the first point-of-interest recommendation request may be calculated by using the following formula (3):

$$y_t = R_{t:s} + \gamma^{(T_t - T_t)} Q'(s_s, a_s)) \tag{3}$$

where $y_t$ represents the target return for the first point-of-interest recommendation request, $R_{t:s}$ represents the instant return for the first point-of-interest recommendation request calculated by using formula (2), $T_s$ represents the initiation time of the second point-of-interest recommendation request $q_s$, $T_t$ represents the initiation time of the first point-of-interest recommendation request $q_t$, $Q(s_s, a_s)$ represents the recommended value obtained by using the target parameter of the point-of-interest recommendation model to process the second environmental state parameter $s_s$ associated with the second point-of-interest recommendation request and the identification parameter $a_s$ of the second target point of interest, and $\gamma$ represents a discount factor.

By using this embodiments of the present disclosure, discounted rewards for a plurality of completion returns in the state transition process from the environmental state $s_t$ to the environmental state $s_s$ are calculated, such that the calculated instant return for the first point-of-interest recommendation request $R_{t:s}$ can effectively reflect an overall return generated for the entire point-of-interest network by recommending the first target point of interest for the first point-of-interest recommendation request. In addition, the largest recommended value for the second point-of-interest recommendation request initiated after the first point-of-interest recommendation request is completed is calculated, such that a future return generated for the entire point-of-interest network by recommending the first target point of interest for the first point-of-interest recommendation request can be effectively reflected.

Figure 4:
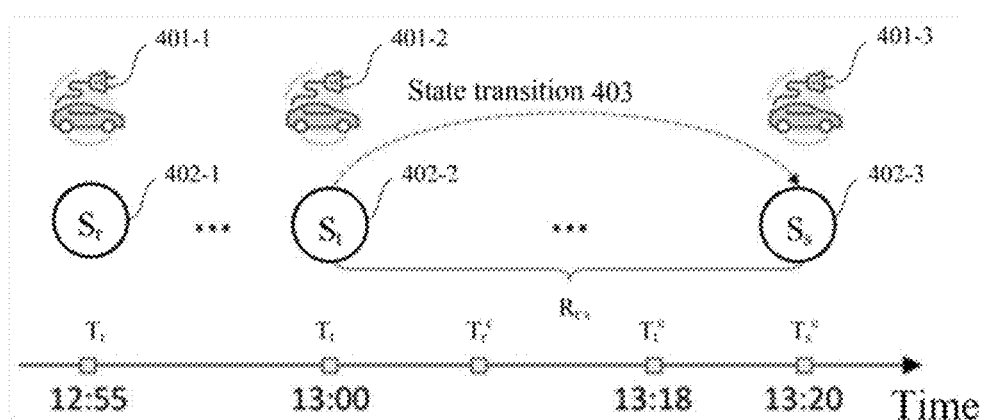
FIG. 4 is a schematic diagram of a point-of-interest recommendation process according to an embodiment of the present disclosure.

FIG. 4 is a schematic diagram of a point-of-interest recommendation process 400 according to an embodiment of the present disclosure.

As shown in FIG. 4, different point-of-interest recommendation requests 401-1, 401-2, and 401-3 are generated at different time points on the time axis. For example, at a time point $T_t$, the point-of-interest recommendation request 401-1 is generated; at a time point $T_t$, the point-of-interest recommendation request 401-2 is generated; and at a time point $T_s$, the point-of-interest recommendation request 401-3 is generated. A completion time of the point-of-interest recommendation request 401-1 is a time point $T_t^c$ between the time point $T_t$ and the time point $T_s$. The point-of-interest recommendation request 401-3 is the point-of-interest recommendation request firstly generated after the point-of-interest recommendation request 401-2 is completed.

In addition, environmental state parameters 402-1 ($s_x$), 402-2 ($s_t$), and 402-3 ($s_s$) for the point-of-interest recommendation requests 401-1, 401-2, and 401-3 may be determined at the time point $T_r$, the time point $T_t$, and the time point $T_s$, respectively. The point-of-interest recommendation request 401-2 may be the first point-of-interest recommendation request $q_t$ described above, and the point-of-interest recommendation request 401-3 may be the second point-of-interest recommendation request $q_s$ described above. The point-of-interest recommendation request 401-1 may be the completed request $q_r$ described above between the initiation time $T_t$ at which the first point-of-interest recommendation request $q_t$ is initiated and the initiation time $T_s$ at which the second point-of-interest recommendation request $q_s$ is initiated.

In this embodiment provided in the present disclosure, a process from the time point $T_t$ of generating the point-of-interest recommendation request 401-2 to the time point $T_s$ of generating the point-of-interest recommendation request 401-3 may be referred to as a process of state transition 403 of a point-of-interest network. Based on the process of state transition 403, a current return and target return for the point-of-interest recommendation request 401-2 can be determined.

For example, the target return $y_t$ for the point-of-interest recommendation request 401-2 can be calculated based on the foregoing formulas (2) and (3), and a current parameter of a point-of-interest recommendation model can be used to process the environmental state parameter $s_t$ associated with the point-of-interest recommendation request 401-2 and an identification parameter $a_t$ of a target point of interest for the point-of-interest recommendation request 401-2 that is determined based on training data, to obtain the current return $Q(s_t, a_t)$ for the point-of-interest recommendation request 401-2.

In the scenario shown in FIG. 4, a loss function of the point-of-interest recommendation model may be calculated based on the following formula (4):

$$L(\theta) = \mathbb{E}_{s_t, a_t, s_s, R_{t:s} \sim D}[(Q(s_t, a_t) - y_t)^2] \tag{4}$$

where $L(\theta)$ represents a loss of the point-of-interest recommendation model, $Q(s_t, a_t)$ represents the current return for the point-of-interest recommendation request $q_t$ that is calculated based on the environmental state parameter $s_t$ and the identification parameter $a_t$ of the target point of interest, $y_t$ represents the target return for the point-of-interest recommendation request $q_t$, D represents a data pool for storing training data, and $\mathbb{E}_{s_t, a_t, s_s, R_{t:s} \sim D}$ represents a mean value for data of the environmental state parameter $s_t$, the identification parameter $a_t$ of the target point of interest, the environmental state parameter $s_s$, and the instant return $R_{t:s}$ of the state transition process that are obtained by sampling from the data pool D.

FIG. 5 is a schematic flowchart of a method 500 for recommending a point of interest according to an embodiment of the present disclosure.

In step S502, a point-of-interest recommendation request may be received. In some embodiments, the point-of-interest recommendation request may be generated in response to input information from a user. In some other embodiments, the point-of-interest recommendation request may be generated in response to a predefined time.

In step S504, in response to receiving the point-of-interest recommendation request, an environmental state parameter associated with the point-of-interest recommendation request may be determined, wherein the environmental state parameter may include resource occupation information and predictive use information of a candidate point(s) of interest when point-of-interest recommendation requests are initiated.

The environmental state parameter may be used to indicate a state of each point of interest in the point-of-interest network when each point-of-interest recommendation request is initiated.

The candidate point(s) of interest may be all or some points of interest included in the point-of-interest network. For example, the candidate point of interest may be some points of interest currently available in the point-of-interest network. For another example, for any point-of-interest recommendation request, the candidate point of interest may be a point of interest within a predetermined distance from an initiation location of the point-of-interest recommendation request.

The resource occupation information may refer to an occupation status of service resources at the point of interest. The predictive use information can indicate the use status of the point-of-interest network within a period of time in the future. In some embodiments, predictive use information of an environmental state parameter associated with a point-of-interest recommendation request includes a predicted amount of other point-of-interest recommendation requests initiated within a predetermined distance around each candidate point of interest within a predetermined time range after the point-of-interest recommendation request is received.

In step S506, the environmental state parameter and an identification parameter of the candidate point of interest may be processed by utilizing the point-of-interest recommendation model, to obtain a recommended value(s) of the candidate point(s) of interest. The point-of-interest recommendation model trained by using the method described in conjunction with FIGS. 2 to 4 may be used to process the environmental state parameter and the identification parameter of the candidate point of interest, to obtain a recommended value of each candidate point of interest.

In step S508, a target point of interest for the point-of-interest recommendation request may be determined based on the recommended value of the candidate point of interest.

In some embodiments, a candidate point of interest with the largest recommended value may be determined as the target point of interest for the point-of-interest recommendation request. For a plurality of candidate points of interest, a recommended value of recommending each point of interest for the point-of-interest recommendation request is considered as an overall return for the point-of-interest network, and a result with the largest overall return is used as a recommendation result.

By using the method for recommending a point of interest provided in the present disclosure, the point-of-interest recommendation model that can optimize a long-run return for the point-of-interest network is used to perform the foregoing method for recommending a point of interest, such that a recommendation result that maximizes the return for the point-of-interest network as a whole can be provided for various point-of-interest recommendation requests.

Figure 6:
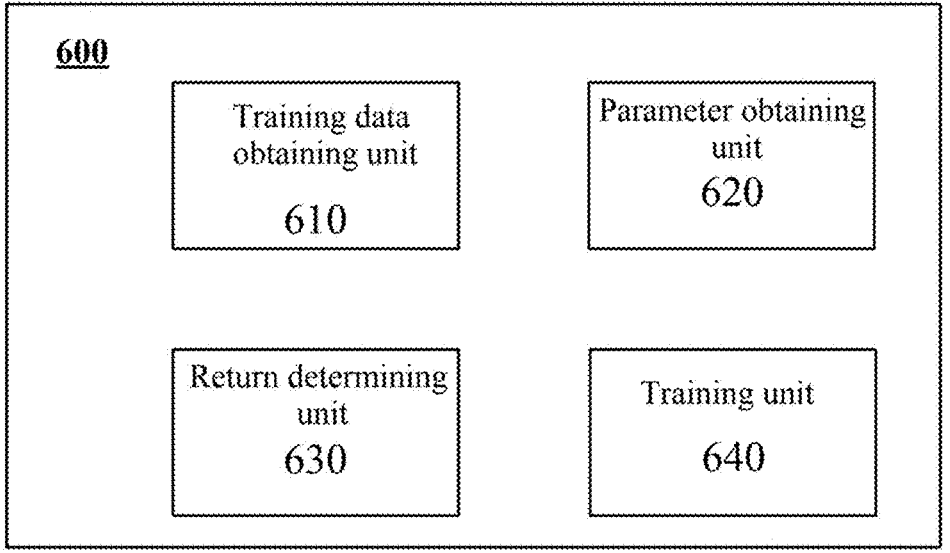
FIG. 6 is a schematic block diagram of a training apparatus for a point-of-interest recommendation model according to an embodiment of the present disclosure.

FIG. 6 is a schematic block diagram of a training apparatus for a point of interest recommendation model according to an embodiment of the present disclosure. As shown in FIG. 6, the training apparatus 600 for the point-of-interest recommendation model may include a training data obtaining unit 610, a parameter obtaining unit 620, a return determining unit 630, and a training unit 640.

The training data obtaining unit 610 may be configured to obtain training data, wherein the training data includes a plurality of point of interest recommendation requests. The parameter obtaining unit 620 may be configured to determine initialization parameters of the point-of-interest recommendation model. The return determining unit 630 may be configured to, for a first point-of-interest recommendation request among the plurality of point-of-interest recommendation requests, determine a current return for the first point-of-interest recommendation request by utilizing the point-of-interest recommendation model to, and determine, based on a second point-of-interest recommendation request initiated after the first point-of-interest recommendation request is completed, a target return for the first point-of-interest recommendation request by utilizing the point-of-interest recommendation model. The training unit 640 may be configured to adjust the initialization parameters of the point-of-interest recommendation model based on a difference between the current return and the target return for the first point-of-interest recommendation request, to obtain final parameters of the point-of-interest recommendation model.

Herein, the operations of the foregoing units 610 to 640 of the training apparatus 600 for the point-of-interest recommendation model are similar to the operations of steps S202 to S208 described above, respectively. Details are not repeated herein.

By using the training apparatus for the point-of-interest recommendation model provided in the present disclosure, for any first point-of-interest recommendation request among the plurality of point-of-interest recommendation requests, a second point-of-interest recommendation request initiated after the first point-of-interest recommendation request is completed may be used determine the target return for the first point-of-interest recommendation request. The target return determined in this way may include a long-run return brought to the entire point-of-interest network after a recommendation is made for the first point-of-interest recommendation request, such that the point-of-interest recommendation model can more easily learn a globally optimal recommendation result.

Figure 7:
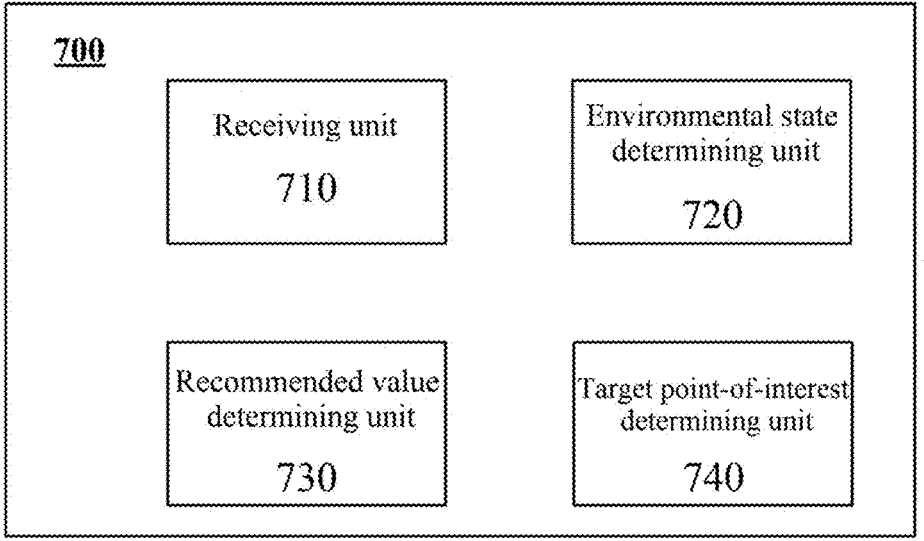
FIG. 7 is a schematic block diagram of an apparatus for recommending a point of interest according to an embodiment of the present disclosure.

FIG. 7 is a schematic block diagram of an apparatus for recommending a point of interest according to an embodiment of the present disclosure. As shown in FIG. 7, the apparatus 700 for recommending a point of interest may include a receiving unit 710, an environmental state determining unit 720, a recommended value determining unit 730, and a target point-of-interest determining unit 740.

The receiving unit 710 may be configured to receive a point of interest recommendation request. The environmental state determining unit 720 may be configured to: in response to receiving the point-of-interest recommendation request, determine an environmental state parameter associated with the point-of-interest recommendation request, wherein the environmental state parameter includes resource occupation information and predictive use information of a candidate point of interest when the point-of-interest recommendation request is initiated. The recommended value determining unit 730 may be configured to process the environmental state parameter and an identification parameter of the candidate point of interest by utilizing the point-of-interest recommendation model, to obtain a recommended value of the candidate point of interest. The target point-of-interest determining unit 740 may be configured to determine a target point of interest for the point-of-interest recommendation request based on the recommended value of the candidate point of interest.

Herein, the operations of the foregoing units 710 to 740 of the training apparatus 700 for the point-of-interest recommendation model are similar to the operations of steps S502 to S508 described above, respectively. Details are not repeated herein.

By using the apparatus for recommending a point of interest provided in the present disclosure, the point-of-interest recommendation model that can optimize a long-run return for the point-of-interest network is used to perform the foregoing method for recommending a point of interest, such that a recommendation result that maximizes the return for the point-of-interest network as a whole can be provided for various point-of-interest recommendation requests.

Figure 8:
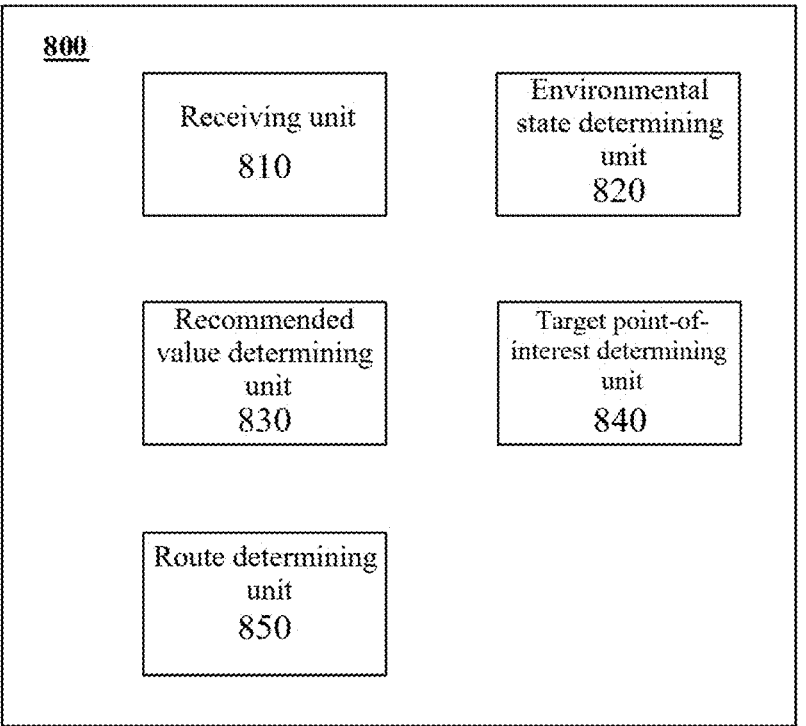
FIG. 8 is a schematic block diagram of a navigation apparatus according to an embodiment of the present disclosure.

FIG. 8 is a schematic block diagram of a navigation apparatus according to an embodiment of the present disclosure. As shown in FIG. 8, the navigation apparatus 800 may include a receiving unit 810, an environmental state determining unit 820, a recommended value determining unit 830, a target point-of-interest determining unit 840, and a route determining unit 850.

The receiving unit 810, the environmental state determining unit 820, the recommended value determining unit 830, and the target point-of-interest determining unit 840 may be implemented by the receiving unit 710, the environmental state determining unit 720, the recommended value determining unit 730, and the target point-of-interest determining unit 740 that are shown in FIG. 7. By using the receiving unit 810, the environmental state determining unit 820, the recommended value determining unit 830, and the target point-of-interest determining unit 840, the method described in conjunction with FIG. 5 can be performed, to determine a target point of interest for a point-of-interest recommendation request.

The route determining unit 850 may be configured to generate a path to the determined target point of interest. In some embodiments, the route determining unit 850 may generate the best path for the path to the determined target point of interest based on a current location, a location of the target point of interest, and real-time traffic information.

Although specific functions are discussed above with reference to specific modules, it should be noted that the functions of the various modules discussed herein may be divided into a plurality of modules, and/or at least some functions of a plurality of modules may be combined into a single module. The specific module performing actions discussed herein includes this specific module performing the action itself, or alternatively, this specific module invoking or otherwise accessing another component or module that performs the action (or performs the action together with this specific module). Thus, the specific module performing the action may include this specific module performing the action itself and/or another module that this specific module invokes or otherwise accesses to perform the action.

According to an embodiment of the present disclosure, there is further provided an electronic device, including: at least one processor; and a memory communicatively connected to the at least one processor, wherein the memory stores instructions executable by the at least one processor, and when executed by the at least one processor, the instructions cause the at least one processor to perform the method described in conjunction with FIGS. 1 to 5.

According to an embodiment of the present disclosure, there is further provided a non-transitory computer-readable storage medium storing computer instructions, wherein the computer instructions are used to cause the computer to perform the method described in conjunction with FIGS. 1 to 5.

According to an embodiment of the present disclosure, there is further provided a computer program product, including a computer program, wherein when the computer program is executed by a processor, the method described in conjunction with FIGS. 1 to 5 is implemented.

Figure 9:
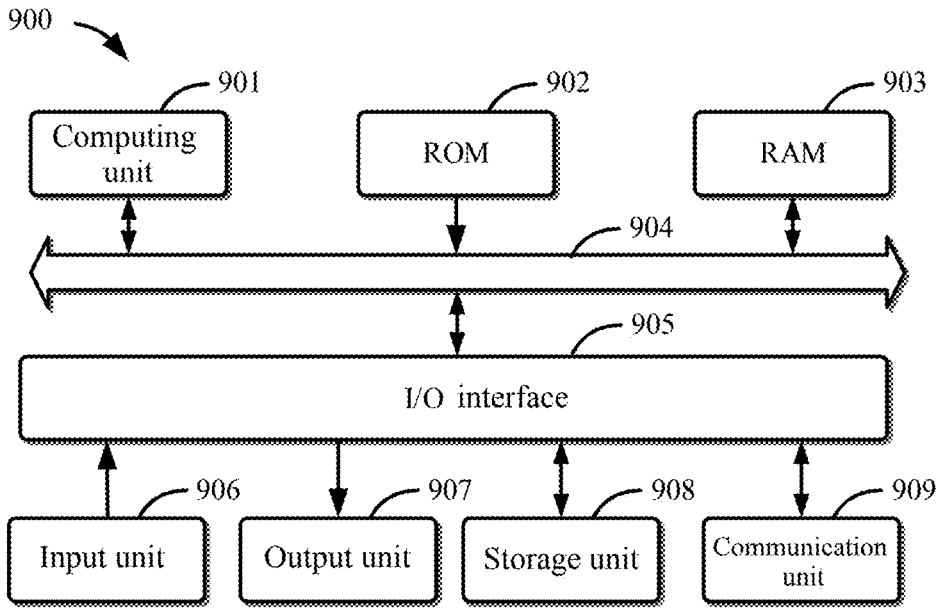
FIG. 9 is a structural block diagram of an example electronic device that can be used to implement an embodiment of the present disclosure.

Referring to FIG. 9, a structural block diagram of an electronic device 900 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 9, the device 900 includes a computing unit 901, which may perform various appropriate actions and processing according to a computer program stored in a read-only memory (ROM) 902 or a computer program loaded from a storage unit 908 to a random access memory (RAM) 903. The RAM 903 may further store various programs and data required for the operation of the device 900. The computing unit 901, the ROM 902, and the RAM 903 are connected to each other through a bus 904. An input/output (I/O) interface 905 is also connected to the bus 904.

A plurality of components in the device 900 are connected to the I/O interface 905, including: an input unit 906, an output unit 907, the storage unit 908, and a communication unit 909. The input unit 906 may be any type of device capable of entering information to the device 900. The input unit 906 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 907 may be any type of device capable of presenting information, and may include, but is not limited to, a display, a speaker, a video/audio output terminal, a vibrator, and/or a printer. The storage unit 908 may include, but is not limited to, a magnetic disk and an optical disc. The communication unit 909 allows the device 900 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 1302.11 device, a Wi-Fi device, a WiMax device, a cellular communication device and/or the like.

The computing unit 901 may be various general-purpose and/or special-purpose processing components with processing and computing capabilities. Some examples of the computing unit 901 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 901 performs the various methods and processes described above, for example, the training method for a point-of-interest recommendation model and the method for recommending a point of interest according to the embodiments of the present disclosure. For example, in some embodiments, the training method for a point-of-interest recommendation model and the method for recommending a point of interest may be implemented as a computer software program, which is tangibly contained in a machine-readable medium, such as the storage unit 908. In some embodiments, a part or all of the computer program may be loaded and/or installed onto the device 900 via the ROM 902 and/or the communication unit 909. When the computer program is loaded to the RAM 903 and executed by the computing unit 901, one or more steps of the training method for a point-of-interest recommendation model and the method for recommending a point of interest described above can be performed. Alternatively, in other embodiments, the computing unit 901 may be configured, by any other suitable means (for example, by means of firmware), to perform the training method for a point-of-interest recommendation model and the method for recommending a point of interest.

Various implementations of the foregoing systems and technologies described herein can be implemented in a digital electronic circuit system, an integrated circuit system, a field programmable gate array (FPGA), an application-specific integrated circuit (ASIC), an application-specific standard product (ASSP), a system-on-chip (SOC) system, a load programmable logic device (CPLD), computer hardware, firmware, software, and/or a combination thereof. These various implementations may include: the systems and technologies are implemented in one or more computer programs, wherein the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program code for implementing the method of the present disclosure can be written in any combination of one or more programming languages. The program code may be provided to a general-purpose computer, a special-purpose computer, or a processor or controller of other programmable data processing devices, such that when the program code is executed by the processor or controller, the functions/operations specified in the flowcharts and/or block diagrams are implemented. The program code may be completely executed on a machine, or partially executed on a machine, or may be, as an independent software package, partially executed on a machine and partially executed on a remote machine, or completely executed on a remote machine or server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable storage medium may include, but is not limited to, an electronic, magnetic, optical, electromagnetic, infrared, or semiconductor system, apparatus, or device, or any combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other by means of digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

Although the embodiments or examples of the present disclosure have been described with reference to the drawings, it should be appreciated that the methods, systems and devices described above are merely example embodiments or examples, and the scope of the present disclosure is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A training method for a point-of-interest recommendation model, the method comprising:

obtaining, by a processor, training data that comprises a plurality of point-of-interest recommendation requests;

determining, by the processor, initialization parameters of the point-of-interest recommendation model;

for a first point-of-interest recommendation request among the plurality of point-of-interest recommendation requests, determining, by the processor, a current return for the first point-of-interest recommendation request by utilizing the point-of-interest recommendation model;

determining, by the processor, based on a second point-of-interest recommendation request among the plurality of point-of-interest recommendation requests initiated after the first point-of-interest recommendation request is completed, a target return for the first point-of-interest recommendation request by utilizing the point-of-interest recommendation model, wherein the first point-of-interest recommendation request is completed when service supply starts to be provided from a point-of-interest corresponding to the first point-of-interest recommendation request; and adjusting, by the processor, the initialization parameters of the point-of-interest recommendation model based on a difference between the current return and the target return for the first point-of-interest recommendation request, to obtain updated parameters of the point-of-interest recommendation model;

wherein the determining the target return for the first point-of-interest recommendation request by utilizing the point-of-interest recommendation model comprises:

determining at least one completed request completed between a first time when the first point-of-interest recommendation request is received and a second time when the second point-of-interest recommendation request is received, wherein the at least one completed request is different from the first point-of-interest recommendation request and the second point-of-interest recommendation request, and the at least one completed request is completed when service supply starts to be provided from at least one point-of-interest corresponding to the at least one completed request;

determining an instant return for the first point-of-interest recommendation request based on a waiting time of each completed request of the at least one completed request;

processing an identification parameter of a second target point-of-interest and a second environmental state parameter associated with the second point-of-interest recommendation request by utilizing the point-of-interest recommendation model, to obtain a maximum recommended value for a target point-of-interest for the second point-of-interest recommendation request, wherein the maximum recommended value is determined as a long-run return for the first point-of-interest recommendation request; and determining the target return for the first point-of-interest recommendation request based on the instant return for the first point-of-interest recommendation request and the long-run return for the first point-of-interest recommendation request.

2. The method of claim 1, wherein the training data further comprises a plurality of environmental state parameters associated with the plurality of point-of-interest recommendation requests, respectively, wherein for each environmental state parameter of the plurality of environmental state parameters, the environmental state parameter comprises resource occupation information and predictive use information of a candidate point of interest at a time when the point-of-interest recommendation request corresponding to the environmental state parameter is initiated.

3. The method of claim 2, wherein for each point-of-interest recommendation request of the plurality of point-of-interest recommendation requests, the predictive use information of the environmental state parameter associated with the point-of-interest recommendation request comprises a predicted amount of other point-of-interest recommendation requests initiated within a predetermined distance around the candidate point of interest within a predetermined time range after the point-of-interest recommendation request is received.

4. The method of claim 3, wherein the environmental state parameter associated with the point-of-interest recommendation request further comprises:

a time when the point-of-interest recommendation request is received;

a traveling time from a geographical location associated with the point-of-interest recommendation request to the candidate point of interest; and service capability information of the candidate point of interest.

5. The method of claim 4, wherein the candidate point of interest is an electric vehicle charging station.

6. The method of claim 5, wherein the resource occupation information of the candidate point of interest comprises an amount of idle charging spaces of a candidate charging station.

7. The method of claim 5, wherein the service capability information of the candidate point of interest is charging power of a candidate charging station.

8. The method of claim 2, wherein the determining the current return for the first point-of-interest recommendation request by utilizing the point-of-interest recommendation model comprises:

determining that a target point of interest for the first point-of-interest recommendation request is a first target point of interest; and processing a first environmental state parameter associated with the first point-of-interest recommendation request and an identification parameter of the first target point of interest by utilizing the point-of-interest recommendation model, to obtain the current return for the first point-of-interest recommendation request.

9. The method of claim 1, wherein the determining the instant return for the first point-of-interest recommendation request comprises:

determining a completion return for each completed request of the at least one completed request based on the waiting time of each completed request, wherein the waiting time is inverse to the completion return; and determining the instant return for the first point-of-interest recommendation request based on a weighted sum of the completion returns for respective completed requests.

10. The method of claim 1, wherein the determining the target return for the first point-of-interest recommendation request based on the instant return for the first point-of-interest recommendation request and the long-run return for the first point-of-interest recommendation request comprises:

determining a weighted sum of the instant return and the long-run return as the target return for the first point-of-interest recommendation request.

11. A method for recommending a point of interest, the method being applied to a computing device running a point-of-interest recommendation model thereon, wherein the method comprises:

receiving a point-of-interest recommendation request;

in response to receiving the point-of-interest recommendation request, determining an environmental state parameter associated with the point-of-interest recommendation request, wherein the environmental state parameter comprises resource occupation information and predictive use information of a candidate point of interest at a time when the point-of-interest recommendation request is initiated;

processing the environmental state parameter and an identification parameter of the candidate point of interest by utilizing the point-of-interest recommendation model, to obtain a recommended value of the candidate point of interest; and determining a target point of interest for the point-of-interest recommendation request based on the recommended value of the candidate point of interest;

wherein the point-of-interest recommendation model is trained by:

obtaining, by a processor, training data that comprises a plurality of point-of-interest recommendation requests;

determining, by the processor, initialization parameters of the point-of-interest recommendation model;

for a first point-of-interest recommendation request among the plurality of point-of-interest recommendation requests, determining, by the processor, a current return for the first point-of-interest recommendation request by utilizing the point-of-interest recommendation model;

determining, by the processor, based on a second point-of-interest recommendation request among the plurality of point-of-interest recommendation requests initiated after the first point-of-interest recommendation request is completed, a target return for the first point-of-interest recommendation request by utilizing the point-of-interest recommendation model, wherein the first point-of-interest recommendation request is completed when service supply starts to be provided from a point-of-interest corresponding to the first point-of-interest recommendation request; and adjusting, by the processor, the initialization parameters of the point-of-interest recommendation model based on a difference between the current return and the target return for the first point-of-interest recommendation request, to obtain updated parameters of the point-of-interest recommendation model;

wherein the determining the target return for the first point-of-interest recommendation request by utilizing the point-of-interest recommendation model comprises:

determining at least one completed request completed between a first time when the first point-of-interest recommendation request is received and a second time when the second point-of-interest recommendation request is received, wherein the at least one completed request is different from the first point-of-interest recommendation request and the second point-of-interest recommendation request, and the at least one completed request is completed when service supply starts to be provided from at least one point-of-interest corresponding to the at least one completed request;

determining an instant return for the first point-of-interest recommendation request based on a waiting time of each completed request of the at least one completed request;

processing an identification parameter of a second target point-of-interest and a second environmental state parameter associated with the second point-of-interest recommendation request by utilizing the point-of-interest recommendation model, to obtain a maximum recommended value for a target point-of-interest for the second point-of-interest recommendation request, wherein the maximum recommended value is determined as a long-run return for the first point-of-interest recommendation request; and determining the target return for the first point-of-interest recommendation request based on the instant return for the first point-of-interest recommendation request and the long-run return for the first point-of-interest recommendation request.

12. The method of claim 11, wherein the determining the target point of interest for the point-of-interest recommendation request comprises:

determining a candidate point of interest with a largest recommended value as the target point of interest for the point-of-interest recommendation request.

13. An electronic device, comprising:

at least one processor; and a memory communicatively connected to the at least one processor, wherein the memory stores instructions executable by the at least one processor, and when executed by the at least one processor, the instructions cause the at least one processor to:

obtain training data that comprises a plurality of point-of-interest recommendation requests;

determine initialization parameters of the point-of-interest recommendation model;

for a first point-of-interest recommendation request among the plurality of point-of-interest recommendation requests, determine a current return for the first point-of-interest recommendation request by utilizing the point-of-interest recommendation model;

determine, based on a second point-of-interest recommendation request among the plurality of point-of-interest recommendation requests initiated after the first pointof-interest recommendation request is completed, a target return for the first point-of-interest recommendation request by utilizing the point-of-interest recommendation model, wherein the first point-of-interest recommendation request is completed when service supply starts to be provided from a point-of-interest corresponding to the first point-of-interest recommendation request; and adjust the initialization parameters of the point-of-interest recommendation model based on a difference between the current return and the target return for the first point-of-interest recommendation request, to obtain updated parameters of the point-of-interest recommendation model;

wherein the determining the target return for the first point-of-interest recommendation request by utilizing the point-of-interest recommendation model comprises:

determining at least one completed request completed between a first time when the first point-of-interest recommendation request is received and a second time when the second point-of-interest recommendation request is received, wherein the at least one completed request is different from the first point-of-interest recommendation request and the second point-of-interest recommendation request, and the at least one completed request is completed when service supply starts to be provided from at least one point-of-interest corresponding to the at least one completed request;

determining an instant return for the first point-of-interest recommendation request based on a waiting time of each completed request of the at least one completed request;

processing an identification parameter of a second target point-of-interest and a second environmental state parameter associated with the second point-of-interest recommendation request by utilizing the point-of-interest recommendation model, to obtain a maximum recommended value for a target point-of-interest for the second point-of-interest recommendation request, wherein the maximum recommended value is determined as a long-run return for the first point-of-interest recommendation request; and determining the target return for the first point-of-interest recommendation request based on the instant return for the first point-of-interest recommendation request and the long-run return for the first point-of-interest recommendation request.

14. The electronic device of claim 13, wherein the training data further comprises a plurality of environmental state parameters associated with the plurality of point-of-interest recommendation requests, respectively, wherein for each environmental state parameter of the plurality of environmental state parameters, the environmental state parameter comprises resource occupation information and predictive use information of a candidate point of interest at a time when the point-of-interest recommendation request corresponding to the environmental state parameter is initiated.

15. The electronic device of claim 14, wherein for each point-of-interest recommendation request of the plurality of point-of-interest recommendation requests, the predictive use information of the environmental state parameter associated with the point-of-interest recommendation request comprises a predicted amount of other point-of-interest recommendation requests initiated within a predetermined distance around the candidate point of interest within a predetermined time range after the point-of-interest recommendation request is received.

16. The electronic device of claim 15, wherein the environmental state parameter associated with the point-of-interest recommendation request further comprises:

a time when the point-of-interest recommendation request is received;

a traveling time from a geographical location associated with the point-of-interest recommendation request to the candidate point of interest; and service capability information of the candidate point of interest.

17. The electronic device of claim 16, wherein the candidate point of interest is an electric vehicle charging station.

18. The electronic device of claim 17, wherein the resource occupation information of the candidate point of interest comprises an amount of idle charging spaces of a candidate charging station.

19. The electronic device of claim 17, wherein the service capability information of the candidate point of interest is charging power of a candidate charging station.

20. The electronic device of claim 14, wherein the determining the current return for the first point-of-interest recommendation request by utilizing the point-of-interest recommendation model comprises:

determining that a target point of interest for the first point-of-interest recommendation request is a first target point of interest; and processing a first environmental state parameter associated with the first point-of-interest recommendation request and an identification parameter of the first target point of interest by utilizing the point-of-interest recommendation model, to obtain the current return for the first point-of-interest recommendation request.

* * * * *